(No Model.) 2 Sheets—Sheet 1.

R. SCHLOTTERHOSS.
PHOTOGRAPHIC EXPOSING APPARATUS.

No. 284,073. Patented Aug. 28, 1883.

WITNESSES:
William Miller
Otto Hufeland

INVENTOR
Richard Schlotterhoss
BY Van Santvoord & Hauff
ATTORNEYS

N. PETERS, Photo-Lithographer, Washington, D. C.

(No Model.) 2 Sheets—Sheet 2.

R. SCHLOTTERHOSS.
PHOTOGRAPHIC EXPOSING APPARATUS.

No. 284,073. Patented Aug. 28, 1883.

WITNESSES:
William Miller
Otto Hufeland

INVENTOR
Richard Schlotterhoss
BY Van Santvoord & Hauff
ATTORNEYS

UNITED STATES PATENT OFFICE.

RICHARD SCHLOTTERHOSS, OF VIENNA, AUSTRIA-HUNGARY.

PHOTOGRAPHIC EXPOSING APPARATUS.

SPECIFICATION forming part of Letters Patent No. 284,073, dated August 28, 1883.

Application filed June 14, 1883. (No model.)

*To all whom it may concern:*

Be it known that I, RICHARD SCHLOTTERHOSS, a subject of the Emperor of Germany, residing at Vienna, in the Empire of Austria, have invented new and useful Improvements in Photographic Exposing Apparatus, of which the following is a specification.

The object of this invention is to expose flexible or elastic bodies, principally such as are sensitive to light—as, for example, prepared papers, textures, or gelatine films—to the influence of rays or other agents—as, for example, an aniline atmosphere in aniline printing—in such a manner that by the operation of a prime mover, by hand or otherwise, all the functions required for the exposition will be accomplished.

The invention consists in the novel combination of parts hereinafter described and claimed, and illustrated in the accompanying drawings, in which—

Figure 1:
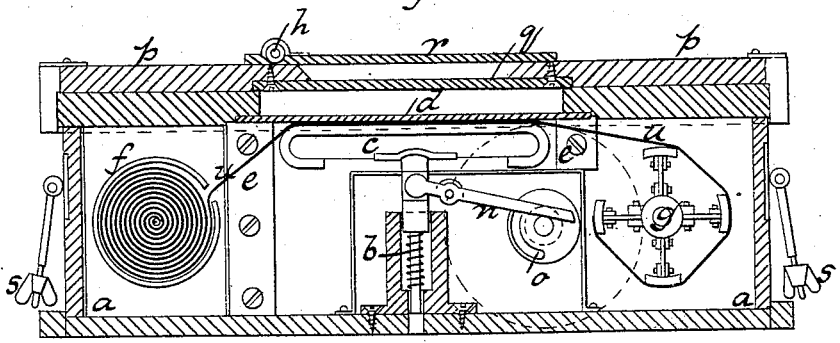
Figure 2:
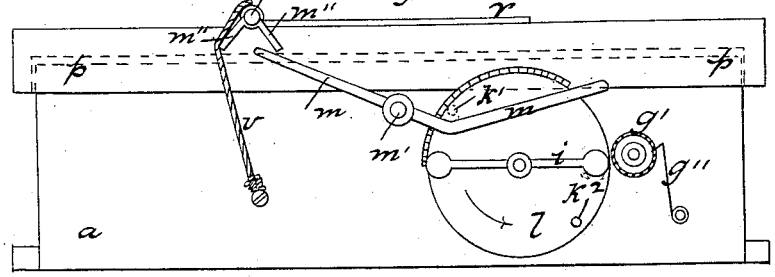
Figure 3:
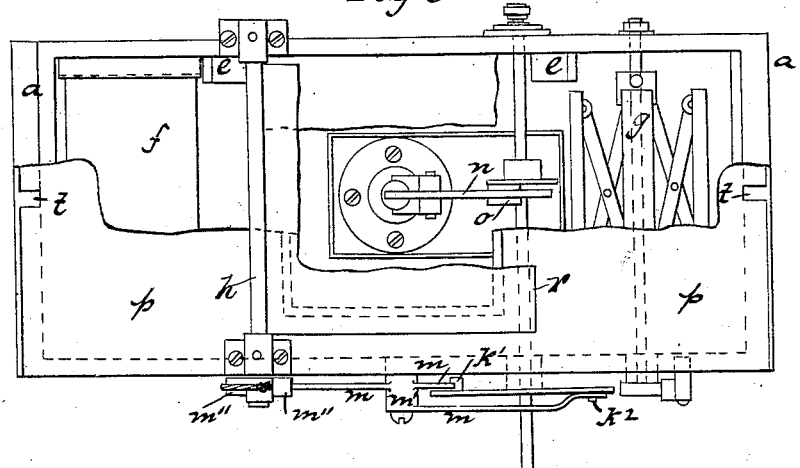
Figure 7:
Figure 4:
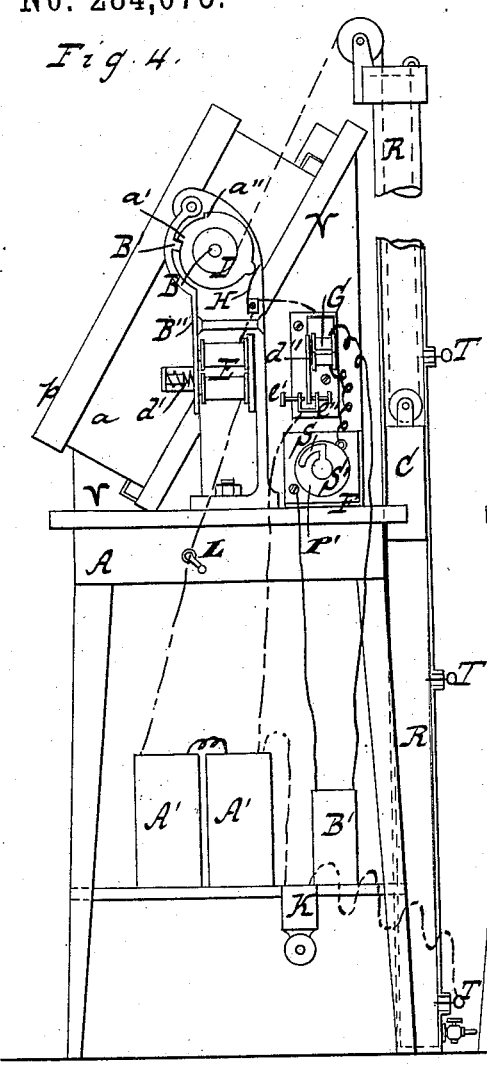
Figure 5:
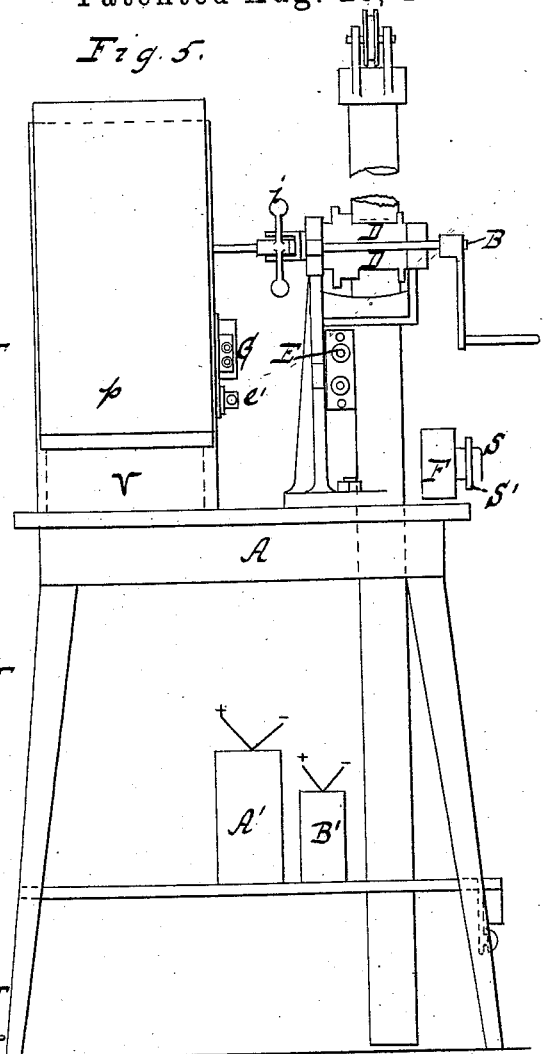
Figure 6:
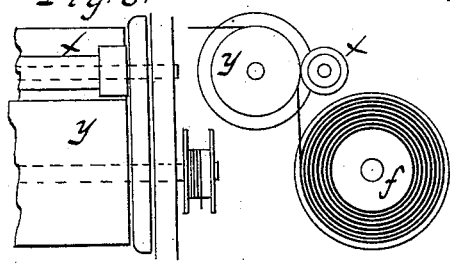

Figure 1 represents a side view of the apparatus, partly in section. Fig. 2 represents a side view of the apparatus. Fig. 3 represents a plan view, partly broken open. Figs. 4 and 5 show a side view and a front view of the apparatus mounted on a stand; Fig. 6, a modification of the means employed for moving the sensitized paper or other body; Fig. 7, a detached view of the insulating-disk; and Fig. 8, a sectional and end view of the box or case, showing a modification in which a slide is used to cover the sensitized paper while a negative is being placed in position.

Similar letters indicate corresponding parts.

In the casing or box $a$, Figs. 1, 2, and 3, is a retaining device, the spring $b$ of which has a tendency to force the press-table $c$ (preferably cushioned) toward the upper part of the apparatus. In large apparatuses several springs $b$ may be employed.

For the purpose of exposing behind negatives, matrices or stereotype-plates, the latter (indicated by the letter $d$, Fig. 1) are placed on the lasts or frame $e$ $e$. To accommodate various sizes of plates, the lasts $e$ $e$ are made movable or removable. Between the press-table $c$ and the negative the body $u$ to be exposed can be moved or passed. The body to be exposed is shown as stored up at one end of the apparatus—for example, in a receiver or case, $f$, provided with an outlet passage or slot—and at the other end such body may be wound up on a spool or grasped by rollers, which may be provided on the surface with grooves, rings, or pins to insure a hold upon the body. By means of this mechanism the body may be drawn over to one side of the apparatus and there stored up.

Figure 8:
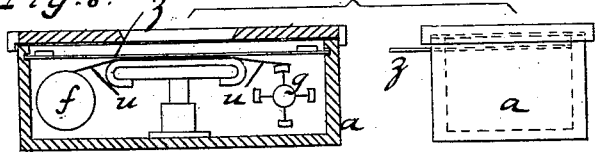

The cover $p$ of the apparatus is provided with an opening, which may be provided with frames or a diaphragm, so that the size of such opening may be increased or diminished. In this opening a glass plate, $q$, may be fastened, if desired. The cover $p$ can be secured in place by nuts $s$, which screw onto swinging arms which pass into slots $t$, Fig. 3, in the cover $p$. When firmly in place, the cover $p$ prevents the matrices or stereotype-plates $d$ from coming out of their proper positions. For the purpose of gaining access to the matrix or plate $d$, and to insert another one without placing the apparatus in a room free from daylight, the slide Z, Fig. 8, is provided, which slide can be moved inward to cover the sensitized paper or other body, which is directly under the matrix or plate, in which position the slide will be between the body $u$ and the matrix or plate. The opening in the cover $p$ may be closed, if desired—as, for example, by the cover $r$ swinging on the axis $h$, or by a slide which may be operated by a rack and pinion, or by a curtain which winds up on a roller, or by any other desired means. An elastic band, $v$, Fig. 2, or a spring or weight, may assist in raising the cover $r$. When the cover $p$ is in place, and the handle $i$, connected with the disk $l$, is turned in the direction of the arrow shown on the disk $l$ in Fig. 2, the stud $k'$, Figs. 2 and 3, on said disk $l$ strikes one arm of the three-armed lever $m$, turning on the pivot $m'$, thereby throwing back the cover $r$ by the action of said lever $m$ on one arm of the fork $m''$ $m''$ on the axis $h$. At this moment the exposition begins. If the same is to cease, the handle $i$ is turned farther in the direction of the arrow, the stud $k^2$ strikes against another arm of lever $m$, and, by the action of said lever $m$ on another arm of the fork $m''$, causes the cover $r$ to swing over the opening in the cover p and close the same, as will be readily seen. At the same time the cam o strikes against the lever n, and, pulling down the press-table c, leaves the body u free to move, while the toothed sector on the disk l catches into the toothed wheel g' on the axis of the receiving-roll g and causes that part of the body u which has been lying under the plate d to move on and a fresh part of said body u to occupy said place. A detent, g'', prevents the wheel g' from turning in the wrong direction. Upon the cam o releasing the lever n the press-plate c presses upon the body u, and the opening in the cover p is again opened, and the operation proceeds as before.

For exposing in a camera, the apparatus may take the place of the box, and the lens-cover may be operated in connection with the remainder of the apparatus, if desired.

The apparatus may be operated by hand, if desired. For the purpose of making the same operate automatically, the apparatus, if desired, in connection with the camera, may be placed on a stand, A, Figs. 4 and 5, and held in a holder, V, at any desired inclination, with the handle i clutched by the forked end of the axle B. Upon turning the axle B the apparatus will operate. This turning may be effected by any suitable device—for example, by clock-work, by a spring or weight, or by any other means. For very large apparatus, for example, it would be advantageous to provide a permanently-revolving wheel, which at certain intervals would come into gear with the axis B and turn the same, and at other periods would be out of gear with such axis. In the case illustrated a weight, C, is employed, which slides quite snugly in a tube, R, filled with air, water, oil, or other substance, retarding the motion of the weight C. This weight pulls on a cord or chain passing about a roller or spool, D, secured to the axle B, thus tending to revolve said axle. As shown in the drawings, the revolution of the axle B may be stopped in two positions by the fluke or detent B' of the anchor B'' coming into engagement with one of the notches a' a'' on the roller or spool D. One of these positions, a'', corresponds to that arrangement of the apparatus in which the cover r is closed, the other, a', to that in which it is opened. If at the proper moment a current flowing about the electromagnet E is interrupted or broken, the apparatus will operate. These current connections and interruptions are brought about by the frictional contact of the hand S of a clock-work or motor, F; or they may be made by hand. In the case illustrated a permanent current flows about the electro-magnet E, which, in connection with the spring d', draws or forces the anchor or detent toward the magnet. If the current is broken, the spool D, actuated by the weight C, presses back the anchor and its detent B', as the spring d' is too weak to resist the strain, and the axle B revolves until the current is again closed and the detent B' engages with one of the notches a' a''.

In the drawings two batteries are shown. The current from the battery A' passes through one of the contact-screws e' e'' into the contact-screw d'', thence about the electro-magnet E, and back to the battery. The current of the battery B' flows to the clock-work or motor F, thence through the friction-contact S onto the insulated dial-plate S', thence about the electro-magnet G of the contact-armature d'', and back to the battery. If upon the dial-plate S', an insulated disk, P', Fig. 7, which may be of paper, is attached, such disk P' being provided with cuts or openings, over which the frictional contact-arm S has to glide, the contact-anchor d'' will be alternately attracted and released by the resulting closing and breaking of the current, and such anchor or armature d'' will oscillate from one contact-screw, e'', to the other, e', and back, thus interrupting the current of battery A' about the electro-magnet E for a sufficiently long period to allow the axle B to free itself and turn until the succeeding notch a' or a'' is caught by the detent B'. The division of the insulating-disk P' by the cuts thus corresponds to the duration of the periods of exposition and with the movements of the apparatus, and any desired period of exposition can be attained.

In Fig. 7, S' represents the dial, and P' the insulating-disk, in which are cuts, through which the dial S' is exposed. The hand or circuit-maker S, in revolving, comes into contact at certain periods with the dial S' through the cuts in the disk P', thus making the circuit. As about equal periods of time are consumed in the functions of the apparatus, the cuts in the disk P' may be made with one and the same instrument—as, for example, a punch or die—care having simply to be taken to measure the duration of exposition, or the distance from the end of one cut to the beginning of the next cut. When the detent B' engages the notch a'—that is, when the cover r of the apparatus is closed—the insulated contact-spring H is in contact with a projection on the spool D. The chain or cord connecting the weight C and spool D is in this instance made of material which conducts electricity, so that the spring H, spool D, and weight C are in electrical connection; also, the tube R is provided with insulated contacts T, any one of which may be adjusted sufficiently far in the tube R to stop the weight C in its descent. A part of the current from battery A' may now make this additional circuit: from the battery through the electro-magnet E, the contact-spring H, spool D, and through the cord or chain to the weight C. When the weight C strikes one of the contacts T, (as shown in the drawings the lowest one is adapted to form connection,) the current just described passes to an alarm or signal, K, and thence to the battery A'. Thus, after the apparatus has operated for a certain time, and a certain number of expositions have taken place, and the weight C has run down, the cover r of the apparatus will remain closed, and the alarm K—which in the example shown is a bell-alarm—will operate, while the current of the electro-magnet E remains closed until the weight C is again raised or wound up. While winding up the weight C the current of battery A' may be cut off, a circuit-breaker, L, being provided for this purpose. Of course various ways may be devised for stopping the apparatus, which may readily suggest themselves to one experienced with the device.

If a considerable number of rapidly-succeeding expositions are to take place—as, for example, in working with highly-sensitive paper—the arrangement shown in Fig. 6 may be employed, where the weight C communicates motion to a press or friction roller, y, between which and the press or friction x the sensitized paper passes. The result of this arrangement is that, while a large amount of the body or sensitized paper may be stored up in the apparatus, the amount of the body passed between the rollers x y and exposed at stated periods will always be equal.

In the case of large dimensions the case a shown in Figs. 1, 2, and 3 may be replaced by a sort of closet, which may at the same time replace the stand A, Figs. 4 and 5.

The exposition periods may always remain constant if the intensity of the rays or agents are regulated according to circumstances—for instance, if the illumination is varied according to the varying densities of the negatives.

In operating a very large apparatus, instead of using a darkened room, the light in the room containing the apparatus may be correspondingly tempered.

What I claim as new, and desire to secure by Letters Patent, is—

1. The combination of the retaining or holding device c, the covering device r, and mechanism connected with the covering device for opening and closing the same, substantially as described.

2. The combination of the retaining device c, the covering device r, and mechanism for opening and closing the covering device and moving the retaining device from action on the sensitized paper or other body, substantially as described.

3. The combination of the receivers $f g$, the retaining device c, the covering device r, the prime mover i, and means connecting the said mover with the retainer and the cover to open and close the cover and move the retainer from action on the sensitized paper or other body, substantially as described.

4. The combination of the covering device r, the fork $m'' m''$, the lever m, the disk l, having studs $k'$ and $k^2$, and means for turning the disk to open and close the covering device, substantially as described.

5. The combination of the covering and retaining devices r and c, the fork $m'' m''$, the lever m, the disk l, having studs $k' k^2$, the prime mover i, having the cam o, and the lever n, for opening and closing the covering device and moving the retaining device from action on the sensitized paper or other body, substantially as described.

6. The combination of a covering device, r, a retaining device, c, and mechanism for automatically opening the covering device to expose the sensitized paper or other body to the influence of light or other agents, substantially as described.

7. The combination, with an exposer provided with a covering device, r, a retaining device, c, and receivers $f g$, of an electro-magnet and a circuit-breaker for rhythmically or intermittently actuating said parts, substantially as and for the purpose set forth.

8. The combination, with an exposer provided with a covering device, r, a retaining device, c, and receivers $f g$, of an electro-magnet, a circuit-breaker, and an alarm, K, substantially as and for the purpose set forth.

9. The combination, with an exposer provided with a covering device, r, a retaining device, c, and receivers $f g$, of an electro-magnet and an adjustable insulator, P', for regulating the operation of said parts, substantially as and for the purpose set forth.

In testimony whereof I have hereunto set my hand and seal in the presence of two subscribing witnesses:

R. SCHLOTTERHOSS. [L. S.]

Witnesses:
E. WINTRELMANN,
WILLIAM HUNING.